(12) United States Patent
Yuan et al.

(10) Patent No.: US 10,162,742 B2
(45) Date of Patent: Dec. 25, 2018

(54) SYSTEM AND METHOD FOR END TO END PERFORMANCE RESPONSE TIME MEASUREMENT BASED ON GRAPHIC RECOGNITION

(71) Applicant: Open Text Corporation, Waterloo (CA)

(72) Inventors: Hong Yuan, Shanghai (CN); Xiaochen Nie, Pleasanton, CA (US); Tingxian Cheng, Shanghai (CN); Yujia Wang, Shanghai (CN); Xia Liu, Shanghai (CN); Chao Chen, Shanghai (CN)

(73) Assignee: Open Text Corporation, Waterloo (CA)

( * ) Notice: Subject to any disclaimer, the term of this patent is extended or adjusted under 35 U.S.C. 154(b) by 0 days.

(21) Appl. No.: 15/915,866

(22) Filed: Mar. 8, 2018

(65) Prior Publication Data

US 2018/0196742 A1    Jul. 12, 2018

Related U.S. Application Data

(63) Continuation of application No. 15/085,922, filed on Mar. 30, 2016, now Pat. No. 9,946,638.

(51) Int. Cl.
*G06K 9/62* (2006.01)
*G06F 11/36* (2006.01)
(Continued)

(52) U.S. Cl.
CPC .......... *G06F 11/3696* (2013.01); *G06F 9/466* (2013.01); *G06F 17/30256* (2013.01);
(Continued)

(58) Field of Classification Search
USPC .......................................................... 382/155
See application file for complete search history.

(56) References Cited

U.S. PATENT DOCUMENTS

| 5,758,007 A | 5/1998 | Kitamura et al. |
| 6,237,059 B1 | 5/2001 | Dean et al. |
| (Continued) | | |

OTHER PUBLICATIONS

Office Action issued in U.S. Appl. No. 15/085,922, dated Aug. 3, 2017, 10 pages.
(Continued)

*Primary Examiner* — Jerome Grant, II
(74) *Attorney, Agent, or Firm* — Sprinkle IP Law Group

(57) ABSTRACT

Software testing techniques based on image recognition are disclosed. In various embodiments, a programmatically implemented image classifier is trained to recognize a screen shot image as being associated with a transaction end condition of a transaction. A test script configured to initiate an iteration of the transaction is run. A start time of the iteration of the transaction is recorded. Screen shot images are generated during performance of the iteration of the transaction to capture a series of screen shot images of at least a portion of a user interface display associated with the iteration of the transaction. The image classifier is used to find an earliest-captured image that matches the transaction end condition. A time associated with the matched image is used as a transaction end time to compute an end-to-end time to perform the iteration of the transaction.

18 Claims, 5 Drawing Sheets

(51) Int. Cl.
    *G06F 17/30*     (2006.01)
    *G06F 9/46*     (2006.01)
    *G06N 99/00*     (2010.01)
    *G06K 9/66*     (2006.01)

(52) U.S. Cl.
    CPC ............ *G06K 9/6267* (2013.01); *G06K 9/66* (2013.01); *G06N 99/005* (2013.01)

(56) References Cited

U.S. PATENT DOCUMENTS

| | | |
|---|---|---|
| 9,686,173 B1 | 6/2017 | Giordano et al. |
| 2011/0231478 A1 | 9/2011 | Wheeler et al. |
| 2014/0188783 A1 | 7/2014 | Agarwal et al. |
| 2015/0286711 A1 | 10/2015 | Chin et al. |
| 2015/0339218 A1 | 11/2015 | Ekambaram et al. |
| 2016/0077658 A1 | 3/2016 | Kim et al. |
| 2016/0292377 A1* | 10/2016 | Nilsson ............... G16H 40/63 |
| 2016/0360125 A1* | 12/2016 | Yamamoto ............ A61B 1/06 |
| 2017/0085962 A1 | 3/2017 | Maughan et al. |
| 2017/0105005 A1 | 4/2017 | Chen et al. |
| 2018/0146263 A1* | 5/2018 | Doherty .......... H04N 21/26258 |

OTHER PUBLICATIONS

Notice of Allowance issued in U.S. Appl. No. 15/085,922, dated Dec. 6, 2017, 6 pages.

\* cited by examiner

SYSTEM AND METHOD FOR END TO END PERFORMANCE RESPONSE TIME MEASUREMENT BASED ON GRAPHIC RECOGNITION

CROSS-REFERENCE TO RELATED APPLICATION(S)

This application is a continuation of, and claims a benefit of priority under 35 U.S.C. 120 of, U.S. patent application Ser. No. 15/085,922, filed Mar. 30, 2016, issued as U.S. Pat. No. 9,946,638, entitled "SYSTEM AND METHOD FOR END TO END PERFORMANCE RESPONSE TIME MEASUREMENT BASED ON GRAPHIC RECOGNITION", which is hereby incorporated herein for all purposes.

BACKGROUND

Performance may be important to consumers in evaluating a modern software product. For example, the end to end time an application takes to perform certain operations and/or tasks, referred to herein as "transactions", may be considered to be an important performance metric. Typically, performance testing may be performed during the product lifecycle of a modern software product, to ensure and demonstrate that the software meets stated performance goals.

Most software uses a user interface to interact with human users, e.g., to receive user input and/or display information. Web-based or other display page-based graphical user interfaces are common. For such software, an end to end transaction may start from an operation initiated through the user interface and end with a change of the user interface, such as to display a result, stop displaying an "operation in progress" animation or other indication, etc. Measuring the response time of end to end transaction manually can be a very time-consuming and monotonous work.

BRIEF DESCRIPTION OF DRAWINGS

Various embodiments of the invention are disclosed in the following detailed description and the accompanying drawings.

DETAILED DESCRIPTION

Figure 1:
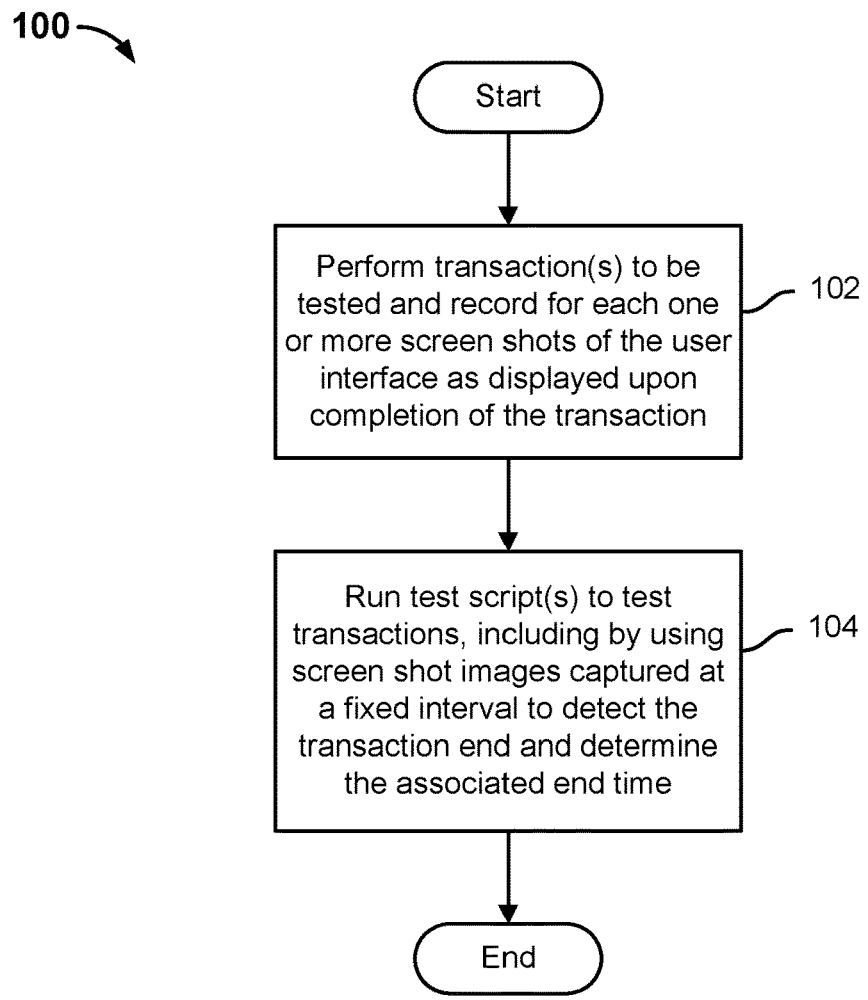
FIG. 1 is a flow chart illustrating an embodiment of a process to use screen shot images captured during testing to perform software testing.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A transaction management system configured to perform automated software testing is disclosed. In various embodiments, the transaction management system trains an image classifier to detect a screen image and/or portion thereof that is associated with the end of a transaction to be tested. During testing, screen shots are captured, e.g., at a fixed interval, and an end of transaction time to be used to compute the time required to complete the transaction is determined at least in part based on a time, such as an image file timestamp, associated with the earliest-taken screen shot image that is determined by the classifier to match the end of transaction.

In various embodiments, the transaction management system may be used to manage software/application testing projects, including the transactions required to be performed. For each transaction, a screenshot tool may be used to capture the user interface display content associated with the end of the transaction. For example, the home page of an application may be rendered after the "login" transaction has been completed.

In various embodiments, a human tester may generate manually one or more reference screenshots for each transaction to be tested. The reference images may be associated with the corresponding end of transaction condition and/or may be used to train an image classifier to identify screen shot images that match the end of transaction condition.

In some embodiments, a user interface element detection tool, such as Sikuli™, may be used to identify within a page a user interface control or other element, for purposes of training the classifier and/or processing screen shot images taken at fixed intervals to detect an end of transaction condition and associated time.

A script recording tool such as Selenium™ may be used to record the test procedure for each transaction. For example, the end-to-end procedure of a login operation may be recorded. Each script should output the start timestamp of the transaction. The script for each transaction will be stored by the transaction management system.

After all the preparation work is done, the transaction management system will trigger the test execution procedure through a script execution engine, such as Selenium™.

During the execution procedure, a screen capturing thread will be execution at a certain interval such as 500 ms. For each transaction, associated screenshots may be stored to a folder corresponding to that transaction.

After the execution procedure, a graphic match engine such as Open CV may be used to match each screenshot with the screenshot prepared in the above step for each transaction. A user could define different match strategies. For example, if the match score is higher than 80 (the score is based on the parameter tuning of the graphic library such as Open CV), then there's a match. A match also could be defined as having been found if a screenshot is or matches a (corresponding) part of another screenshot. After a match is found, the earliest taken matched screenshot is considered as the end of the transaction. For example, the timestamp of the earliest-taken screenshot may be used as the end time of a transaction. The response time is computed by subtracting from the end timestamp the start timestamp stored by the script execution engine at the time the transaction was started.

FIG. 1 is a flow chart illustrating an embodiment of a process to use screen shot images captured during testing to perform software testing. In the example shown, process 100 includes a step 102 in which transactions to be tested using techniques disclosed herein are performed, e.g., manually by a human technician, such as a test engineer, and in which for each of one or more transactions a corresponding set of one or more images, such as user interface screen shot images, associated with the transaction end condition are captured and configured to be used to detect a transaction end condition during subsequent testing. For example, in an administrative user interface and/or environment, a test engineer may be provided an interface and associated functionality to manually initiate a transaction, receive a screen shot image of a resulting end of transaction user interface page, and select either the entire image or a portion thereof to be stored in a set of training images to be used to train a classifier to detect corresponding image content in screen shots generated during subsequent iterations of the test. In step 104, scripts are run to perform automated testing of the application or other software, and screen shots generated during a transaction that has been initiated by such a script during testing are used to detect a transaction end condition and associated time, which is used as a transaction end time to compute an end-to-end time required to complete the transaction.

Figure 2:
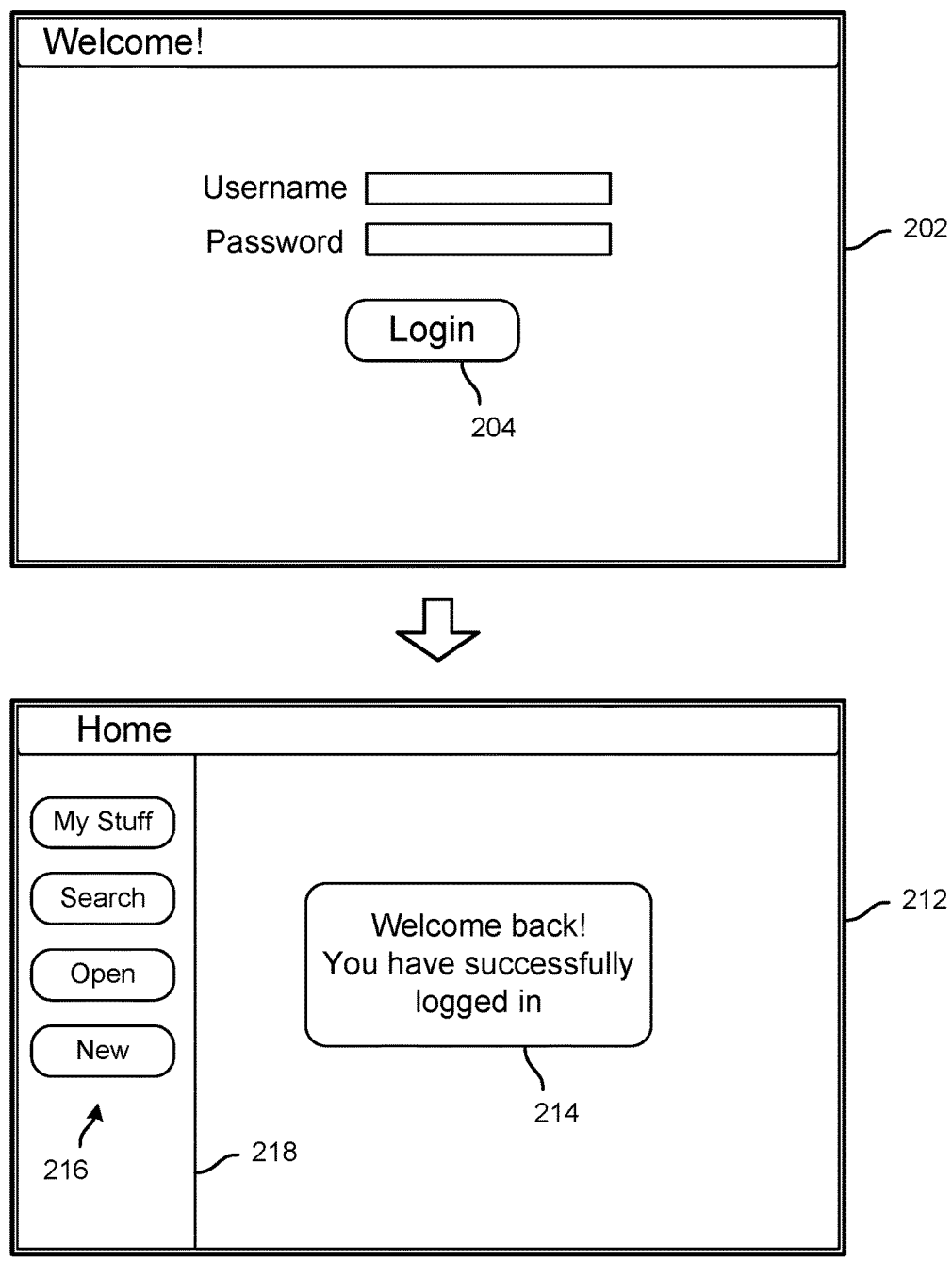
FIG. 2 is a diagram illustrating an example of transaction beginning and ending user interface pages.

FIG. 2 is a diagram illustrating an example of transaction beginning and ending user interface pages. In the example shown, a "Welcome!" page 202 is displayed. Page 202 includes text boxes and associated prompts to enter a username and password, and an associated user-selectable control 204 to "Login". In some embodiments, a "login" transaction may be considered to start upon selection (e.g., by click) of control 204 and to end upon display of a home page 212, as shown in the lower part of FIG. 2. In the example shown, home page 212 includes a displayed "success" message box 214 comprising text in an associated basic shape (in this example) displayed centrally on page 212. In addition, a number of home page controls 216 are displayed in a side bar portion 218 of page 212. In various embodiments, screen shot images of one or more of the entire page 212 and/or one or more components distinctively associated with page 212, such as message box 214, controls 216, and/or side bar 218, may be designated to be stored as a reference image to be used to train an image classifier or other component to detect corresponding pages in subsequent, e.g., automated, iterations of the "Login" transaction.

Figure 3:
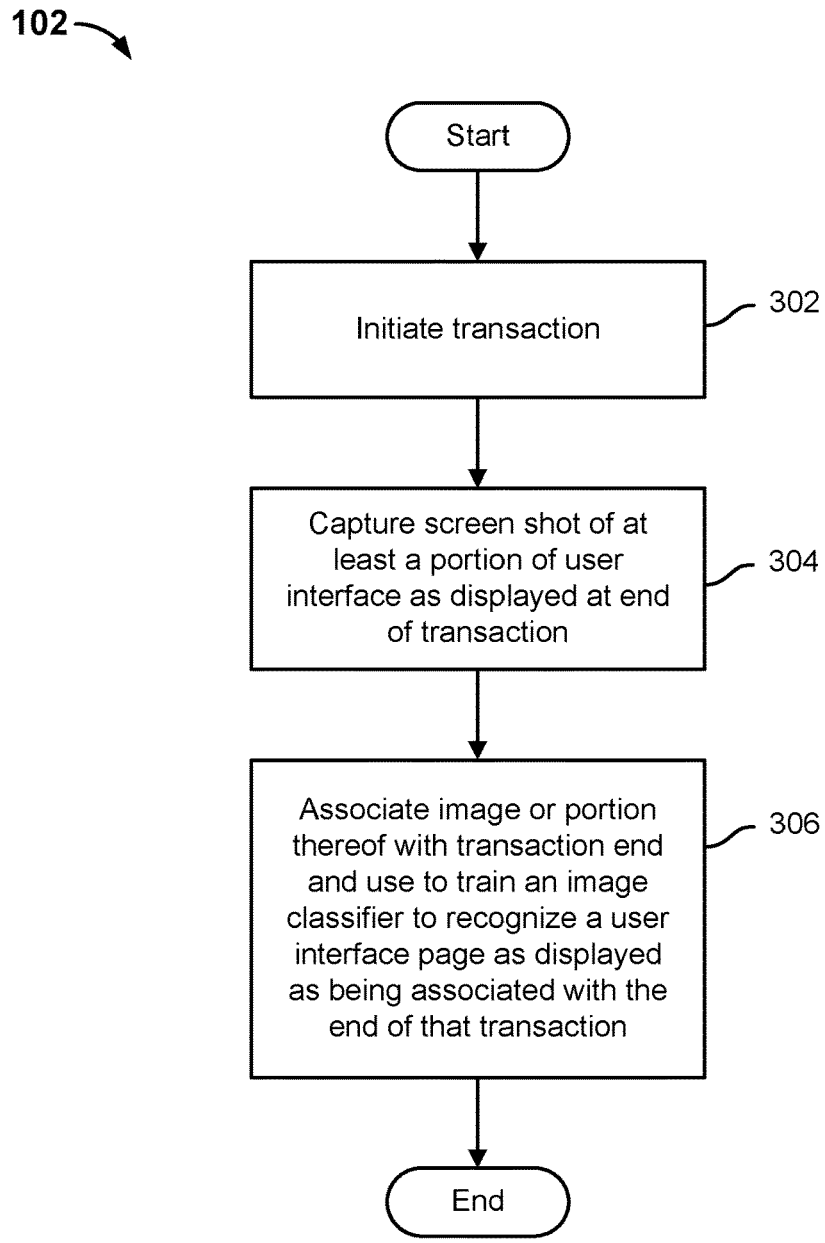
FIG. 3 is a flow chart illustrating an embodiment of a process to configure a transaction management system to detect a transaction end condition.

FIG. 3 is a flow chart illustrating an embodiment of a process to configure a transaction management system to detect a transaction end condition. In various embodiments, the process of FIG. 3 may be used to implement step 102 of the process of FIG. 1. In the example shown, a transaction to be tested is initiated (302). In various embodiments, the transaction may be initiated manually or programmatically, e.g., by a test script. A screen shot of at least a portion of a resulting user interface page associated with the end of the transaction is captured (304). The image and/or selected portion(s) thereof are identified (e.g., by a user who initiated the transaction manually) as being associated with the end of the transaction, and are used to train an image classifier to recognize corresponding (i.e., matching) image content in a subsequently evaluated screen shot image (306).

Figure 4:
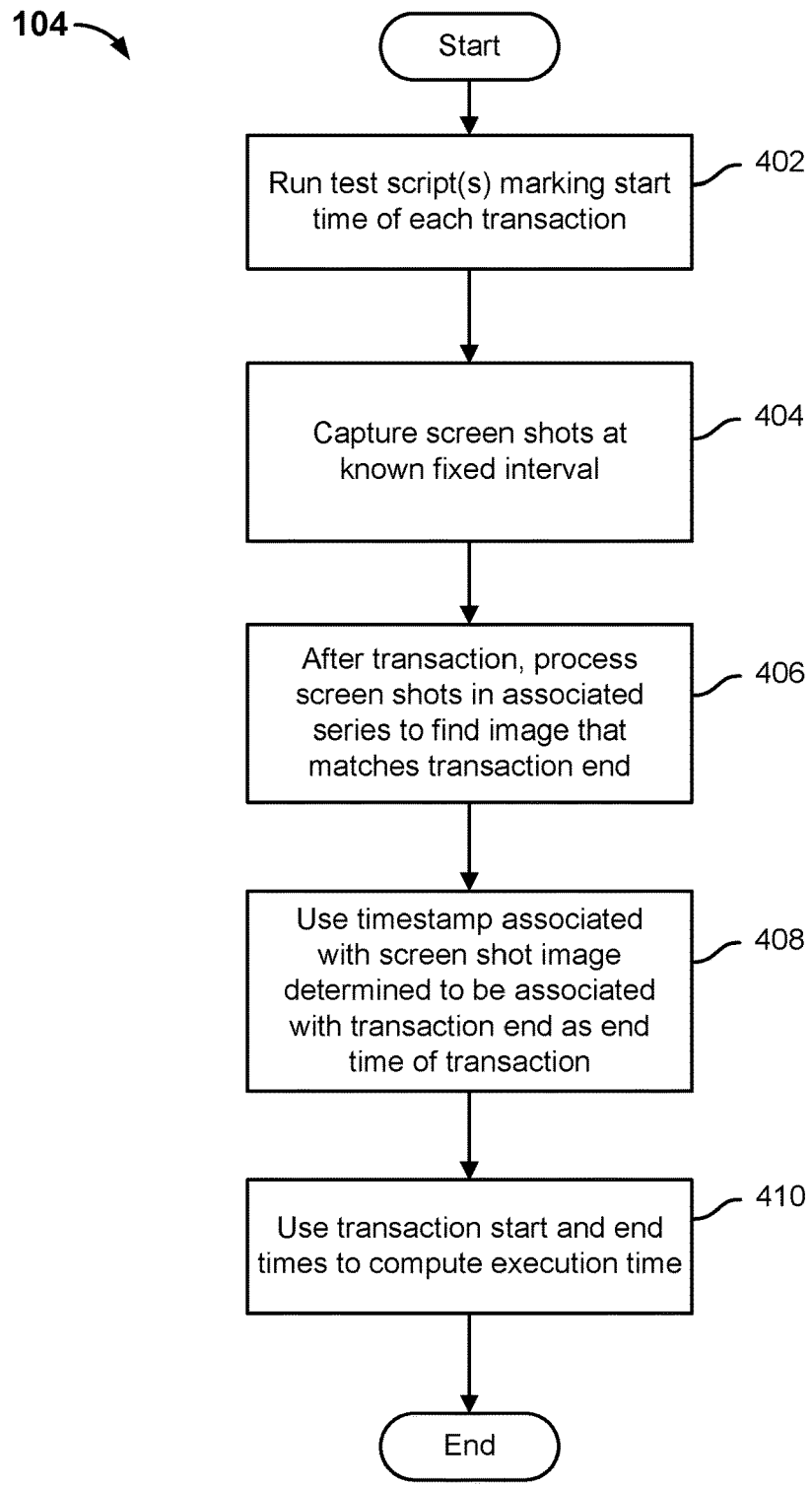
FIG. 4 is a flow chart illustrating an embodiment of a process to perform software testing using user interface screen shot images to detect a transaction end condition.

FIG. 4 is a flow chart illustrating an embodiment of a process to perform software testing using user interface screen shot images to detect a transaction end condition. In various embodiments, the process of FIG. 4 may be used to implement step 104 of the process of FIG. 1. In the example shown, for each transaction to be tested a corresponding test script is run and the start time of the transaction is recorded (402). While the transaction is being performed, screen shots of the user interface page(s) are captured, e.g., at a prescribed, fixed interval (404). The series of screen shots so generated are processed, e.g., by an image classifier, to find an earliest-captured image that matches the transaction end condition (406). A timestamp associated with the screen shot determined to match the end of transaction condition is used as an end time for the transaction (408). The previously-recorded transaction start time and the transaction end time determined in step 408 are used to compute an end-to-end execution time for the transaction (410).

Figure 5:
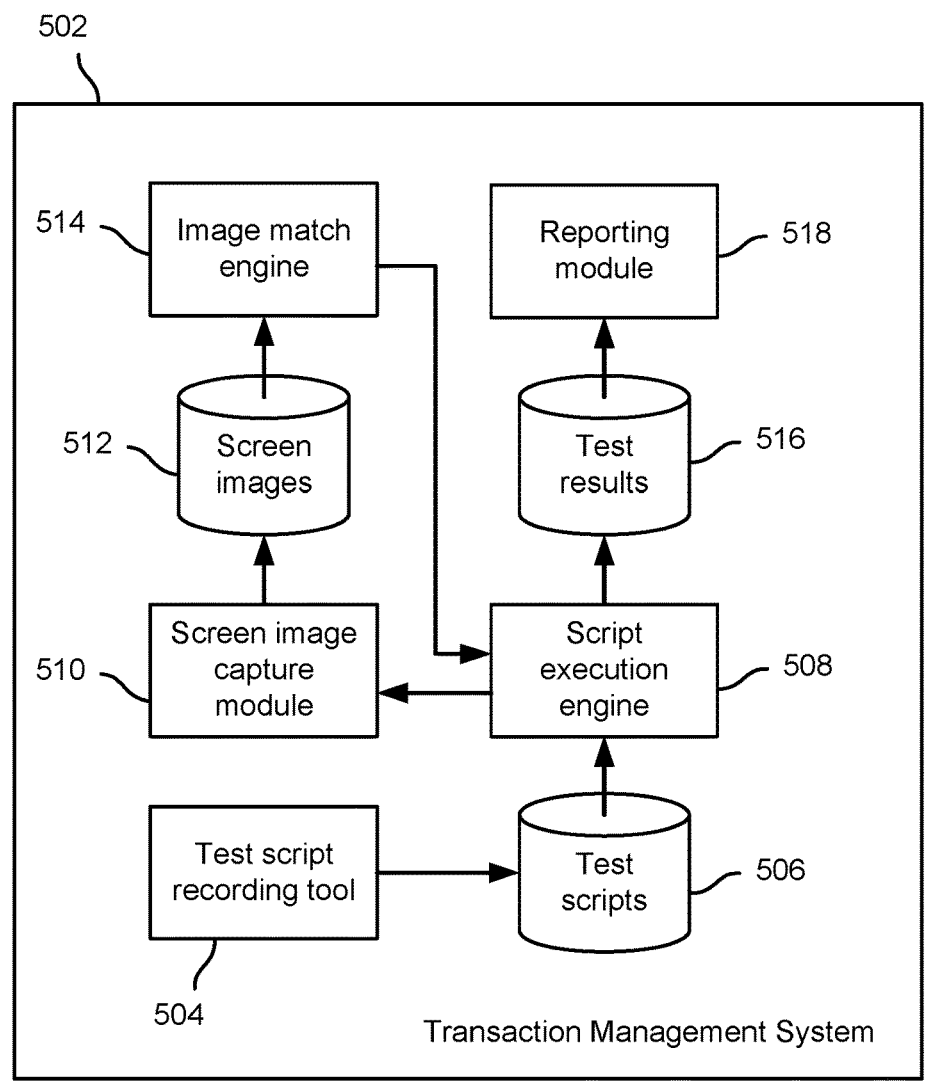
FIG. 5 is a block diagram illustrating an embodiment of a transaction management system.

FIG. 5 is a block diagram illustrating an embodiment of a transaction management system. In various embodiments, the transaction management system 502 of FIG. 5 may perform one or more of the processes of FIGS. 1, 3, and 4. In the example shown, transaction management system 502 includes a test script recording tool 504 configured to generate a test script for each of one or more tests to be performed. For example, user interface and/or other interactions that occur in connection with a manually initiated transaction may be recorded and a test script generated to replicate the same interactions. The resulting test scripts are stored in a test script data store 506, e.g., one or more files, etc. A script execution engine 508 is configured to run the test scripts 506. In various embodiments, the script execution engine 508 may be configured to record a transaction start time for a transaction initiated by a script and to prompt a screen image capture module 510 to capture screen images at a fixed interval during performance of a test/transaction. Screen image capture module 510 may also be used, in some embodiments, a test preparation time to store in screen images data store 512 one or more reference (training) images of a user interface page in an end transaction state, to be used to train image match engine 514 to identify a matching image from a series of screen shots or other screen images captured during subsequent testing.

Image match engine 514 may be an OpenCV or other Haar image classifier. In various embodiments, during testing, image match engine 514 determines an image that matches a transaction end condition and provides one or both of an identification of the image and an associated timestamp to the script execution engine (or a separate test results generation module) to be used as an end of transaction time for the associated test. The script execution engine 508 (in this example) uses the timestamp associated with the earliest-taken screen image determined by the image match engine 514 to match an end of transaction condition and a transaction start time recorded by script execution engine 508 when the script initiated the transaction to compute an end-to-end performance time for the transaction, which is included in test results stored in a test results data set 516. Test results 516 are used by a reporting module 518 to generate and provide (e.g., display) a report reflecting the performance time computed for the transaction.

One example embodiment comprises a software testing system comprising a memory and a processor coupled to the memory. The processor is configured to train a programmatically implemented image classifier to recognize a screen shot image as being associated with a transaction end condition of a transaction, run a test script configured to initiate an iteration of the transaction, record a start time of the iteration of the transaction, cause screen shot images to be generated and stored in the memory during performance of the iteration of the transaction to capture a series of screen shot images of at least a portion of a user interface display associated with the iteration of the transaction, use the image classifier to find an earliest-captured image that matches the transaction end condition, and use a time associated with the matched image as a transaction end time to compute an end-to-end time to perform the iteration of the transaction.

Another example embodiment comprises a software testing method, comprising training a programmatically implemented image classifier to recognize a screen shot image as being associated with a transaction end condition of a transaction, running a test script configured to initiate an iteration of the transaction, recording a start time of the iteration of the transaction, causing screen shot images to be generated during performance of the iteration of the transaction to capture a series of screen shot images of at least a portion of a user interface display associated with the iteration of the transaction, using the image classifier to find an earliest-captured image that matches the transaction end condition, and using a time associated with the matched image as a transaction end time to compute an end-to-end time to perform the iteration of the transaction.

Another example embodiment comprises a computer program product to perform software testing, the computer program product being embodied in a non-transitory computer readable storage medium and comprising computer instructions for training a programmatically implemented image classifier to recognize a screen shot image as being associated with a transaction end condition of a transaction, running a test script configured to initiate an iteration of the transaction, recording a start time of the iteration of the transaction, causing screen shot images to be generated during performance of the iteration of the transaction to capture a series of screen shot images of at least a portion of a user interface display associated with the iteration of the transaction, using the image classifier to find an earliest-captured image that matches the transaction end condition, and using a time associated with the matched image as a transaction end time to compute an end-to-end time to perform the iteration of the transaction.

In various embodiments, transaction management system may be implemented on one or more servers or other computers, each comprising one or more processors and one or more storage devices, such as memory or one or more disk drives.

Techniques disclosed herein may be used to conduct performance testing using minimal resources and without using resources of the browser itself, which could affect the performance of the application under test. The resources that may be required to conduct event-based detection of the start and end of a transaction are not required, and typically no changes to the source code of the software being tested would be required, as might otherwise be required to add instrumentation code to the application source code, for example.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A computer program product to perform software testing, the computer program product being embodied in a non-transitory computer readable storage medium and comprising computer instructions for:
   initiating a performance test iteration of a transaction;
   recording a start time of the performance test iteration of the transaction;
   capturing screen shot images of at least a portion of a user interface during performance of the performance test iteration of the transaction, each screen shot image having an associated timestamp;
   processing the screen shot images with an image classifier trained to detect at least a portion of a screen image that is associated with an end of transaction condition to identify a screen shot image from the screen shot images that matches the end of transaction condition;
   using a time from the timestamp associated with the identified screen shot image as a transaction end time to compute an end-to-end time to perform the performance test iteration of the transaction; and
   updating test results for the transaction with the end-to-end time.

2. The computer program product of claim 1, wherein the image classifier comprises a Haar image classifier.

3. The computer program product of claim 1, wherein the image classifier comprises an OpenCV image classifier.

4. The computer program product of claim 1, further comprising instructions for training the image classifier to recognize the at least the portion of the screen image as being associated with the end of transaction condition, wherein training the image classifier includes initiating a training iteration of the transaction and receiving an indication of a screen shot of a result end of transaction display for the training iteration.

5. The computer program product of claim 1, wherein the screen shot images are captured at a fixed interval.

6. The computer program product of claim 5, wherein the timestamp associated with the identified screen shot image comprises a timestamp of an image file for the identified screen shot image.

7. The computer program product of claim 1, wherein the end-to-end time is computed by subtracting the start time of the performance test iteration of the transaction from the end time.

8. The computer program product of claim 1, wherein the image classifier is trained to recognize a characteristic element comprising an end of transaction display page.

9. The computer program product of claim 1, wherein the performance test iteration of the transaction is initiated by a test script.

10. A software testing system, comprising:
    a processor; and
    a computer readable storage medium comprising instructions executable by the processor to:

initiate a performance test iteration of a transaction;

record a start time of the performance test iteration of the transaction;

capture screen shot images of at least a portion of a user interface during performance of the performance test iteration of the transaction, each screen shot image having an associated timestamp;

process the screen shot images with an image classifier trained to detect at least a portion of a screen image that is associated with an end of transaction condition to identify a screen shot image from the screen shot images that matches the end of transaction condition;

use a time from the timestamp associated with the identified screen shot image as a transaction end time to compute an end-to-end time to perform the performance test iteration of the transaction; and update test results for the transaction with the end-to-end time.

11. The system of claim 10, wherein the image classifier comprises a Haar image classifier.

12. The system of claim 10, wherein the image classifier comprises an OpenCV image classifier.

13. The system of claim 10, further comprising instructions executable by the processor to initiate a training iteration of the transaction and receive an indication of a screen shot of a result end of transaction display for the training iteration.

14. The system of claim 10, wherein the screen shot images are captured at a fixed interval.

15. The system of claim 14, wherein the timestamp associated with the identified screen shot image comprises a timestamp of an image file for the identified screen shot image.

16. The system of claim 10, wherein the end-to-end time is computed by subtracting the start time of the performance test iteration of the transaction from the end time.

17. The system of claim 10, wherein the image classifier is trained to recognize a characteristic element comprising an end of transaction display page.

18. The system of claim 10, wherein the performance test iteration of the transaction is initiated by a test script.

* * * * *